United States Patent
Hebling et al.

(10) Patent No.: US 11,474,414 B2
(45) Date of Patent: Oct. 18, 2022

(54) REFLECTION AND/OR DIFFRACTION-BASED METHOD AND SETUP TO GENERATE HIGH-ENERGY TERAHERTZ PULSES

(71) Applicant: Pécsi Tudományegyetem, Pécs (HU)

(72) Inventors: János Hebling, Pécs (HU); Gábor Almási, Kozármisleny (HU); László Pálfalvi, Pécs (HU); György Tóth, Pécs (HU)

(73) Assignee: PÉCSI TUDOMÁNYEGYETEM, Pécs (HU)

(*) Notice: Subject to any disclaimer, the term of this patent is extended or adjusted under 35 U.S.C. 154(b) by 0 days.

(21) Appl. No.: 17/290,478

(22) PCT Filed: Oct. 31, 2019

(86) PCT No.: PCT/HU2019/050048
§ 371 (c)(1),
(2) Date: Apr. 30, 2021

(87) PCT Pub. No.: WO2020/188307
PCT Pub. Date: Sep. 24, 2020

(65) Prior Publication Data
US 2022/0011645 A1    Jan. 13, 2022

(30) Foreign Application Priority Data

Oct. 31, 2018 (EP) .................................... 18203893
Apr. 15, 2019 (EP) .................................... 19169363

(51) Int. Cl.
*G02F 1/35* (2006.01)
*G02F 1/355* (2006.01)

(52) U.S. Cl.
CPC .......... *G02F 1/3544* (2013.01); *G02F 1/3534* (2013.01); *G02F 1/3551* (2013.01); *G02F 2203/13* (2013.01)

(58) Field of Classification Search
CPC ... G02F 1/3534; G02F 1/3544; G02F 2203/13
See application file for complete search history.

(56) References Cited

U.S. PATENT DOCUMENTS

| 7,272,158 B1 | 9/2007 | Hayes |
| 7,339,718 B1 * | 3/2008 | Vodopyanov ............. G02F 1/39 |
| | | 359/326 |

(Continued)

FOREIGN PATENT DOCUMENTS

| EP | 2354841 | 8/2011 |
| EP | 3396447 | 10/2018 |

(Continued)

OTHER PUBLICATIONS

L. Pálfalvi et al, Hybrid tilted-pulse-front excitation scheme for efficient generation of high-energy terahertz pulses; Optics Express; vol. 24, No. 8, Apr. 6, 2016; 14 pages.

(Continued)

*Primary Examiner* — Daniel Petkovsek
(74) *Attorney, Agent, or Firm* — Fitch, Even, Tabin & Flannery LLP

(57) ABSTRACT

A technique to generate terahertz radiation is disclosed, where a pump beam (12) is coupled into an optical element (50) made of a medium with non-linear optical properties having plane-parallel front and rear boundary surfaces (51, 52), wherein the pump beam (12) is split into a set of partial pump beams (121) by reflection and/or diffraction on a periodic relief structure (53) of said optical element (50). The partial pump beams travel along a direction at an angle γ that satisfies the velocity matching condition of $v_{p,cs} \cos(\gamma) = v_{THz,f}$ within the given medium, where $v_{p,cs}$ is the (Continued)

group velocity of the pump beam, $v_{THz,f}$ is the phase velocity of the terahertz radiation and the speed a planar envelope (212) travels toward the front boundary surface (51) of the optical element (50), and angle γ is the angle formed by the pulse front envelope and the phase front of the pump beam.

38 Claims, 4 Drawing Sheets

(56) References Cited

U.S. PATENT DOCUMENTS

| | | |
|---|---|---|
| 8,514,482 B2 | 8/2013 | Okano |
| 8,564,875 B2 | 10/2013 | Kawada |
| 9,024,260 B2 | 5/2015 | Ouchi |
| 10,359,687 B2 | 7/2019 | Almási |
| 10,481,468 B2 | 11/2019 | Hebling |
| 10,747,086 B2 | 8/2020 | Hebling |
| 2013/0075629 A1 | 3/2013 | Doi |
| 2018/0292729 A1 | 10/2018 | Almási |
| 2018/0373119 A1 | 12/2018 | Hebling |

FOREIGN PATENT DOCUMENTS

| | | |
|---|---|---|
| JP | 2010139604 | 6/2010 |
| JP | 2014044365 | 3/2014 |
| WO | 2017081501 | 5/2017 |

OTHER PUBLICATIONS

Hebling J. et al., "Velocity matching by pulse front tilting for large-area THz-pulse generation", Optics Express, (2002), vol. 10, No. 21; 6 pages.
H. Hirori et al., "Single-cycle terahertz pulses with amplitudes exceeding 1 MV/cm generated by optical rectification in LiNbO3", Applied Physics Letters, (2011), vol. 98, No. 9; 3 pages.
Blanchard et al., "Terahertz pulse generation from bulk GaAs by a tilted-pulse-front excitation at 1.8 μm", Applied Physics Letters, (2014), vol. 105; 5 pages.
J. Fiilop et al., "Design of high-energy terahertz sources based on optical rectification", Optics Express, (2010), vol. 18, No. 12; 17 pages.
J. Fiilop et al., "Design of high-energy terahertz sources based on optical rectification: erratum"; Optics Express, vol. 19, No. 23; Nov. 7, 2011; 1 page.
L. Palfalvi et al., "Novel setups, for extremely high power single-cycle terahertz pulse generation by optical rectification", Applied Physics Letters, (2008), vol. 92, No. 1; 4 pages.
A. Nagashima et al., "Design of Rectangular Transmission Gratings Fabricated in LiNbO3 for High-Power Terahertz-Wave Generation", Japanese Journal of Applied Physics, (2010), vol. 49; 6 pages.
A. Nagashima et al., "Design of Rectangular Transmission Gratings Fabricated in LiNbO3 for High-Power Terahertz-Wave Generation", Japanese Journal of Applied Physics-Erratum, 2012, vol. 51; 2 pages.
Ollmann Z. et al., "Design of a contact grating setup for mJ-energy THz pulse generation by optical rectification", Applied Physics B, (2012), vol. 108, No. 4; 6 pages.
Ollmann Z. et al., "Design of a high-energy terahertz pulse source based on ZnTe contact grating", Optics Communications, (2014), No. 315; 5 pages.
M. Kunitski et al., "Optimization of single-cycle terahertz generation in LiNbO3 for sub-50 femtosecond pump pulses", Optics Express, (2013), vol. 21, No. 6; 11 pages.
Written Opinion of the International Searching Authority dated May 24, 2019 for PCT/HU2018/050036; 7 pages.
International Search Report dated Jun. 6, 2017 for PCT/HU2016/050046; 4 pages.
Michael I. Bakunov et al., "Terahertz generation with tilted-front laser pulses in a contact-grating scheme"; Journal of the Optical Society of America-B., US, vol. 31, No. 11, Nov. 2014; 10 pages.
J. A. Fülöp et al., entitled "Efficient generation of THz pulses with 0.4 mJ energy"; Optics Express; vol. 22, issue 17, pp. 20155-20163, 2014; 9 pages.
Tsubouchi et al. published in the Conference Proceedings of the "41th International Conference on Infrared, Millimeter and Terahertz Waves (IRMMW-THz)" (Sep. 25-30, 2016) under the title of Compact device for intense THz light generation: Contact grating with Fabry-Perot resonator; 2 pages.
G.K. Abgaryan et al., entitled "Investigation of Parameters of Terahertz Pulses Generated in Single-Domain LiNbO3 Crystal by Step-Wise Phase Mask" (see Journal of Contemporary Physics (Armenian Academy of Siences), vol. 51, issue 1, pp. 35-40, 2016; 6 pages.
Ofori-Okai et al., entitled "THz generation using a reflective stair-step echelon" (see Optics Express, vol. 24, issue 5, pp. 5057-5067, 2016; 12 pages.
J. A. Fülöp et al. entitled "Design of high-energy terahertz sources based on optical rectification" (Optics Express, vol. 18., pp. 12311-12327, 2010; 17 pages.
Ollmann et al.; entitled Design of a Contact Grating Setup for mJ-Energy THz Pulse Generation by Optical Rectification; Applied Physics B Lasers and Optics; published online Sep. 23, 2012; 6 pages.
L. Pálfalvi et al., "Numerical Investigation of a Scalable setup for Efficient Terahertz Generation Using a Segmented Tilted-Pulse-Front Excitation"; Optics Express, vol. 25, issue 24 pp. 29560-29573.
Written Opinion of the International Searching Authority dated Nov. 24, 2020 for PCT/HU2019/050048; 8 pages.
International Search Report dated Nov. 24, 2020 for PCT/HU2019/050048; 4 pages.
J. A. Fülöp et al. entitled "Highly Efficient Scalable Monolithic Semiconductor Terahertz Pulse Source", Optica, vol. 3, No. 10, Sep. 21, 2016, 4 pages.

\* cited by examiner

REFLECTION AND/OR DIFFRACTION-BASED METHOD AND SETUP TO GENERATE HIGH-ENERGY TERAHERTZ PULSES

CROSS-REFERENCE TO RELATED APPLICATIONS

This application is the National Stage of International Application No. PCT/HU2019/050048, filed Oct. 31, 2019, which claims the benefit of European Patent Application No. 18203893.5 filed Oct. 31, 2018, and European Patent Application No. 19169363.9 filed Apr. 15, 2019.

TECHNICAL FIELD

The present invention relates to a method and setup to generate terahertz radiation. In particular, the present invention relates to a reflection- and/or diffraction-based method and setup comprising neither imaging means nor an optical grating to be adjusted separately for generating terahertz pulses with improved beam properties, efficiency and energy scalability of the terahertz pulses thus obtained.

BACKGROUND

At present, the acceleration of electrically charged particles, such as e.g. electrons or protons, is a new and promising field of application of intense terahertz (THz) pulses with frequencies ranging from about 0.1 THz to about 10 THz (as per agreement). Terahertz pulses are conventionally generated by coupling ultrashort light pulses, i.e. light pulses having a pulse length ranging from several femtosecond (fs) to several picoseconds (ps), into a crystal with nonlinear optical properties, in general, by means of optical rectification within the crystal. To this end, pump pulses in the visible or near infrared domain are typically used with pulse lengths of several hundred femtoseconds.

To achieve efficient terahertz radiation generation, a so called velocity matching condition has to be met. Accordingly, the group velocity of the pump pulse used for the terahertz radiation generation has to be equal to the phase velocity of the THz pulse thus generated.

To achieve efficient terahertz radiation generation, it is also a requisite that the crystal with nonlinear optical properties exhibits a large second order nonlinear optical coefficient. For many materials that meet this requirement (that is, the second-order nonlinear optical coefficient is typically greater than several ten pm/V's), the difference between the refractive indices of the material measured in the infrared and THz ranges is also large. This applies for some semiconductors, such as e.g. gallium phosphide (GaP), zinc telluride (ZnTe), and gallium arsenide (GaAs), as well as lithium niobate (LN) and lithium tantalate (LT) that have exceptionally high (about 160 to 170 pm/V) nonlinear optical coefficients. For the last two materials, the ratio of the group refraction index at the pump frequency in the infrared domain and the phase refraction index in the THz domain is greater than two. This makes said velocity matching between the pumping and the terahertz pulse, as a requirement, unachievable by conventional techniques. Nevertheless, the tilted-pulse-front technique (see the paper by J. Hebling et al., entitled "*Velocity matching by pulse front tilting for large-area THz-pulse generation*"; Optics Express; Vol. 10, issue 21, pp. 1161-1166. (2002)) provides a solution for this problem. According to this, generation of terahertz radiation is accomplished by a light pulse, whose pulse front (intensity front) is at a desired angle ($\gamma$) to the wave front. As the THz beam generated propagates perpendicularly to the tilted pulse front, to satisfy the requirement of velocity matching, the projection of the pumping group velocity $v_{p,cs}$ along the direction of THz radiation propagation has to be equal to the phase velocity $v_{THz,f}$ of the THz beam, that is, the relation of $$v_{p,cs} \cos(\gamma) = v_{THz,f} \quad (1)$$

has to be met. In particular, for pump wavelengths in the near-infrared domain, said relation is satisfied at $\gamma \approx 62°$ to 63° for LN, $\gamma \approx 68°$ to 69° for LT, and $\gamma \approx 22°$ to 29° for ZnTe.

Nowadays, the highest energy THz pulses with frequencies suitable for particle acceleration (i.e. of about 0.2 to 2.0 THz) can be generated by means of LN crystals and by exploiting the tilted-pulse-front technique (see the paper by J. A. Fülöp et al., entitled "Efficient generation of THz pulses with 0.4 mJ energy"; *Optics Express; Vol.* 22, issue 17, pp. 20155-20163 (2014)). The high energy THz radiation sources described in this publication, which produce pulse energies of 0.43 mJ, always make use of a prism shaped LN crystal as the nonlinear optical crystal. The reason for this, on the one hand, is that to minimize the reflection losses, the pump pulse has to enter the crystal at right angle and the THz pulse generated has to exit from it also at right angle. Coupling out the THz beam at right angle also ensures that the THz beam thus generated will be free from angular dispersion which is a very important requirement from the point of view of further utilization. Accordingly, to meet the velocity matching condition of relation (1) above, the exit plane of the LN crystal used in the THz radiation source has to form well-defined wedge angle with the entry plane of the LN crystal which is just equal to the angle $\gamma$. Hereinafter, the term 'exit plane' refers to a substantially flat surface of a non-linear optical medium used in a terahertz source through which the THz beam generated exits the medium, while the term 'entry plane' will refer to a substantially flat surface of the optical medium through which the pump beam enters said optical medium.

As the value of the wedge angle for LN crystals is large ($\gamma \approx 63°$ at room temperature, $\gamma \approx 62°$ at 100 K), application of a prism shaped medium to generate THz radiation with high energies is highly detrimental to the quality of the THz beam generated: for a wide pump beam, which is necessary for generating high energy THz pulses, the THz pulses being formed at opposite sides of the pump beam in cross-section are generated over significantly different spatial lengths and, thus, are subject to absorption and dispersion to different extents in the LN crystal; moreover, the nonlinear effects are also different at said locations of generation in the crystal. Therefore, both the intensity of and the temporal electric field profile in the THz pulses generated at symmetrical opposite spatial portions of the pump pulse are significantly different, i.e. a highly asymmetric THz beam of bad quality is obtained. As a result, the THz beam cannot be subjected to strong focusing (the extent of which would anyway correspond to the extent of focusing limited by diffraction), which highly limits the realization of an effective particle acceleration in two respects. On the one hand, due to the large size of the focused beam, no electric field strength and therefore acceleration field gradient high enough can be achieved for the efficient particle acceleration, and on the other hand, the large size of the focused spot makes it impossible to accurately synchronize the THz pulse with the particle to be accelerated by said pulse, which is also a requisite for the effective particle acceleration.

International Publication Pamphlet No. WO2017/081501 A2 discloses a so-called conventional tilted-pulse-front excitation scheme. Here, pulse-front-tilt of the pump beam is generally obtained by diffracting said pump beam on a (reflection or transmission) optical grating which is arranged in the beam path. Then the beam is guided, through imaging means, preferably a lens or a telescope, by means of imaging into a crystal with nonlinear optical properties for terahertz radiation generation: an image of the beam spot falling onto the surface of the grating is created inside the crystal. Imaging errors of conventional tilted-pulse-front THz radiation sources induce distortion of the pump pulse, namely, said errors result in a local increase of the pump pulse length. In case of pump beams with large cross-sections (i.e. for wide pump beams), this is highly detrimental to the efficiency of the terahertz radiation generation. To remedy this, a scientific publication by L. Pálfalvi et al., entitled "Novel setups for extremely high power single-cycle terahertz pulse generation by optical rectification"; Applied Physics Letters, Vol. 92, issue 1., pp. 171107-171109 (2008)) proposes the application of a so-called contact grating scheme for generating THz radiation that is free from any imaging optics, and thus from imaging errors due to the imaging optics. In this scheme a tilt of the pulse front is obtained by diffracting the pump beam on a transmission optical grating formed directly (e.g. by etching) in the surface of the nonlinear crystal. The magnitude of the period of the grating to be formed (generally, in the micrometer or sub-micrometer domain) is determined by the material of the nonlinear crystal and the wavelength of the pumping. For example, for LN and assuming a pump wavelength of typically ~1 μm, the contact grating has to be provided with a line density of typically at least 2500-3000 1/mm (see the paper by Nagashima et al., entitled "Design of Rectangular Transmission Gratings Fabricated in LiNbO3 for High-Power Terahertz-Wave Generation", Japanese Journal of Applied Physics, vol. 49, pp. 122504-1 to 122504-5 (2010); and the corrected paper entitled "Erratum: Design of Rectangular Transmission Gratings Fabricated in LiNbO3 for High-Power Terahertz-Wave Generation", Japanese Journal of Applied Physics, vol. 51, p. 122504-1 (2012), as well as the paper by Ollmann et al., entitled "Design of a contact grating setup for mJ-energy THz pulse generation by optical rectification", Applied Physics B, vol. 108, issue 4, pp. 821-826 (2012)). For the time being, preparation of an optical grating with such a line density is not obvious in practice at all; related test experiments show, for example, that the profile of the obtained grating becomes blurred if the line density of the grating exceeds a threshold value (which is about 2000 1/mm for LN). Consequently, diffraction efficiency of the obtained grating falls greatly behind the theoretically predicted value, which results in a drastic reduction of the efficiency of the terahertz radiation generation due to the highly reduced efficiency of coupling in the pump pulse.

A further significant disadvantage of the contact grating scheme lies in the fact that it is not possible to generate terahertz radiation efficiently with a plane-parallel structure is used; it is thus unavoidable to tilt the entry and exit planes relative to each other (at an angle of about 30°, for LN), and to make use of the medium for terahertz radiation generation in the form of a prism-shaped element (see the above-referred paper by Ollmann et al. from 2012).

The paper by Tsubouchi et al. published in the Conference Proceedings of the "41th International Conference on Infrared, Millimeter and Terahertz Waves (IRMMW-THz)" (25-30 Sep. 2016) with the title "Compact device for intense THz light generation: Contact grating with Fabry-Perot resonator" discloses a method for generating terahertz pulses by means of contact grating. To increase the coupling efficiency into the crystal with nonlinear optical properties provided by a plane-parallel element, a double coating layer acting as a Fabry-Perot resonator is formed between the surface of the crystal and the diffraction grating. Coupling out the obtained THz beam from said plane-parallel element at the exit plane takes place along a direction other than perpendicular. In case of THz pulses consisting of a few cycles only and having a wide bandwidth, this is highly disadvantageous: separation of the individual spectral components makes impossible the practical utilization of the THz pulses thus obtained.

The paper by Ofori-Okai et al., entitled "THz generation using a reflective stair-step echelon" (see Optics Express, vol. 24, issue 5, pp. 5057-5067 (2016)) discloses a tilted-pulse-front technique for terahertz radiation generation, wherein pulse-front-tilt of the pump beam is achieved via reflection on a stepped structure arranged at a given distance from the crystal with nonlinear optical properties with a period of about one hundred micrometers in magnitude (this is a scheme for generation based on a so-called reflection echelle grating) instead of a diffraction grating with a period falling into the micrometer domain. When being reflected, the pulse front of the pump beam is subject to an average tilt, whose extent is determined by the ratio of the height and width of the steps of said stepped structure. The pulse front will exhibit a fine structure that is step-like. The extent of the pulse-front-tilt required to satisfy the condition of velocity matching is set by the imaging optics arranged in the propagation path of the pump pulse. The THz radiation thus generated propagates within the crystal along a direction perpendicular to the envelope of the stepped pulse front. Thus, coupling out the THz radiation from the crystal requires a prism with the same wedge angle (e.g. of 63°, for an LN crystal) as in the conventional scheme (see above). Consequently, especially when using wide pump beams needed for high energy terahertz radiation generation, the THz radiation obtained will be asymmetric and thus is unfit, among other, for e.g. particle acceleration.

The paper by L. Pálfalvi et al., entitled "Numerical investigation of a scalable setup for efficient terahertz generation using a segmented tilted-pulse-front excitation" (see Optics Express, vol. 25, issue 24, pp. 29560-29573 (2017)), proposes a terahertz pulse source of plane-parallel structure (essentially based on either LN or LT, or less preferably on further media with nonlinear optical properties). Said source generates symmetric terahertz pulse profile even with wide pump beams. In the scheme, which is based on satisfying the velocity matching condition according to relation (1) and has high terahertz-generation efficiency, a first optical element with angular-dispersion-inducing properties, imaging optics, and a medium with nonlinear optical properties for generating the terahertz radiation are arranged in the propagation path of a pump beam emitted by a pump beam source. The medium with nonlinear optical properties is provided in the form of a light-transmitting (i.e. transparent to the pump beam) crystal with nonlinear optical properties defined by an entry plane and an exit plane parallel to each other (i.e. said crystal is plane-parallel shaped), wherein the entry plane is formed as a stair-step structure. The period of the stair-step structure is greater by at least one or two orders of magnitude than the wavelength of the pump beam striking on said structure. From now on, the structure is referred to as 'plane-parallel echelon (or stepped/stair-step) contact grating'.

When passing through the stair-step structure, the pulse front of the pump beam achieves a segmented structure which can be described by an average tilting angle. To accomplish such terahertz radiation generation which is of maximum efficiency and also satisfies the velocity matching condition, certain geometrical conditions must be met. On the one hand, the plane-parallel echelon contact grating shall be arranged in the propagation path of the pump beam in such a way that an angle $\gamma$ Nm formed between an imaginary plane laid on the longitudinal edges of the individual stairs (that is, the envelope of said plane-parallel echelon contact grating) and a plane perpendicular to the propagation direction is equal to the angle of the velocity matching condition in relation (1). On the other hand, just before entry into the medium with nonlinear optical properties, the pulse front of said pump beam shall be parallel to said envelope of the plane-parallel echelon contact grating.

Terahertz beams generated in the scheme based on plane-parallel echelon contact grating are characterized by higher symmetry compared to terahertz beams generated by the former known technical solutions. However, as the scheme based on plane-parallel echelon contact grating also contains optical elements based on conventional pulse front tilting (i.e. angle dispersive elements and imaging optical elements), the terahertz energy achievable thereby is limited. Moreover, imaging errors arising in tilted-pulse-front THz radiation sources result in the distortion of the pump beam, in particular a local increase of the pump beam length. Although, in the scheme based on plane-parallel echelon contact grating a smaller pulse front (pre)tilting shall be induced in comparison with that of the conventional tilted-pulse-front scheme, and hence the extent of pump beam distortion will be smaller, in case of large beam sizes, said distortion may significantly increase which is inacceptable for many practical applications.

SUMMARY

In light of the aforementioned, an object of the present invention is to provide a method and a setup—from now on, a technique—to generate terahertz radiation applicable in practical fields, that allow the generation of terahertz pulses of excellent beam properties (in particular, with symmetric beam profiles, as far as the most important beam characteristics is concerned) and in a scalable manner. Herein and from now on, the term 'scalable' refers to the fact that the radius of the cross-sectional beam spot of the pump beam applied in the terahertz radiation source according to the invention—which is proportional to the square root of the terahertz pulse energy to be obtained—can be varied essentially between arbitrary limits while maintaining the excellent beam properties of the terahertz radiation generated. Preferably, said radius of the beam spot can be varied from a value in the mm domain to at least several centimeters; the size of several centimeters basically corresponds to the dimensions of the crystals with nonlinear optical properties which can be nowadays produced.

A further object of the present invention is to provide a technique for terahertz radiation generation by means of which the pulse energies of THz pulses achievable nowadays can be further increased.

A yet further object of the present invention is to provide THz radiation sources which are compact. To this end, basically, it is a requisite to decrease the number of optical elements used within said THz radiation sources. Thus, an object of the present invention is to minimize the number of optical elements needed to be used in relation to a terahertz radiation generation technique.

A yet further object of the present invention is to provide a technique to generate terahertz radiation for producing electrically charged particles monochromatic in energy and accelerating said particles efficiently in a synchronized way.

The afore-mentioned objects are achieved by elaborating the method to generate terahertz radiation according to claim 1, by providing the optical elements in accordance with claim 11 and claim 12, and by constructing the terahertz radiation source according to claim 24 by making use of such optical elements. Further preferred variants of the method according to the invention are set forth in claims 2 to 10. Further preferred embodiments of said optical elements are set forth in claims 13 to 23. Preferred embodiments of the terahertz radiation source according to the invention are set forth in claims 25 to 27.

Furthermore, in harmony with claim 28, the terahertz radiation generated by the method according to the invention or the terahertz radiation source according to the invention can preferentially be used to monochromatize and synchronously accelerate electrically charged particles.

In particular, our studies have led us to the conclusion, that the aforementioned objects can be achieved by a novel setup for terahertz radiation generation based on satisfying the velocity matching condition, wherein a medium with non-linear optical properties suitable for terahertz radiation generation is arranged in the propagation path of a pump beam emitted by a pump beam source, wherein the medium is defined (along a first propagation direction of the pump beam) by a front boundary surface and a rear boundary surface parallel to one another, wherein said front boundary surface is a plane surface, and said rear boundary surface is (i) either provided with a periodic relief structure, or is (ii) in optical coupling with a periodic relief that forms part of a separate further element arranged apart from the medium with nonlinear optical properties. The periodic relief structure is comprised of at least first zones with width w and, optionally, second zones with width u separating said first zones from one another. Here, the first zones are provided in the form of planes tilted relative to said rear boundary surface, the planes, in pairs, are V-shaped in a longitudinal sectional view along the first propagation direction of the pump beam. The second zones are provided in the form of planes parallel to said front boundary surface. The value of width u ranges from zero to at most a few % of width w, preferably at most 5% of width w. During terahertz generation, the pump beam emitted by the pump beam source enters the medium with nonlinear optical properties through the front boundary surface, travels through said medium along the first propagation direction, and reaches the structured rear boundary surface of the optical medium or the structured surface of the separate further element being in optical coupling with the rear boundary surface of said optical medium. Said first zones with width w split the incident pump beam (at least by one of reflection and diffraction) into a plurality of partial pump beams, wherein the propagation direction of each partial pump beam forms an angle $\gamma$ with the incident pump beam, or rather said first propagation direction (here and from now on, the angle formed with the incident pump beam is always an acute angle). The value of angle $\gamma$ is determined by relation (1). The geometry of the periodic relief structure, and/or the order of magnitude of said widths w and u define various embodiments of the setup for terahertz radiation generation according to the invention. A common feature of these embodiments is that the planes forming the first zones with width w form an angle of γ/2 with an average (or mid-) plane of the rear boundary surface. Putting this another way, partial pump beams due to the first zones always satisfy the matching condition according to relation (1), while partial pump beams due to the second zones do not satisfy the matching condition of relation (1). Here and from now on, the term rear 'average (or mid-) surface/plane' of the medium with nonlinear optical properties refers to a planar rear boundary surface of said optical medium which forms the rear boundary surface (with no relief structure) of the optical medium along the propagation direction of the pump beam in the optical medium before subjecting the optical medium to machining in order to create said relief structure in said optical medium.

A preferred embodiment of the inventive solution is characterized, optionally for the choice of u=0, by a periodic relief structure that has a spatial period of width 2w which is greater by at least one order of magnitude, preferably two orders of magnitude than the wavelength of the pump beam, and at most half of the wavelength of the terahertz radiation to be generated in the medium with nonlinear optical properties. For terahertz generation, the pump beam emitted by the pump beam source enters the medium with nonlinear optical properties through the front boundary surface of the medium, travels through said medium, and then gets reflected on either the structured rear boundary surface of the medium with the relief structure or on a surface relief which is formed in a separate element and is in optical coupling with said rear boundary surface. As a result of the reflection, the pump beam incident on the relief structure splits into a plurality of partial pump beams. Due to the special geometry of the relief structure, one group of the partial pump beams travels at an angle γ corresponding to the velocity matching condition of relation (1) relative to the incoming pump beam, and another group of the partial pump beams travels at an angle −γ relative to the incoming pump beam (here, the angles relative to the incoming pump beam are acute angles).

The intensity front of each partial pump beam is not tilted relative to the phase front of the respective partial pump beam. The set of intensity fronts of the partial pump beams is located around a plane which is parallel to both the front boundary surface and the rear average (or mid-) surface of the nonlinear optical medium, and travels at a speed $v_{THz,f}$ corresponding to relation (1) in the direction of the front boundary surface of the medium. This average intensity front moving at speed $v_{THz,f}$ generates terahertz radiation in the nonlinear optical medium in a manner consistent with velocity matching. The thus generated terahertz radiation travels towards and perpendicular to the front boundary surface of the nonlinear optical medium and then, upon reaching said front boundary surface, exits the nonlinear optical medium without changing its propagation direction—thus, after having been properly separated from the incoming pump beam, it can be used in further applications. Since the pulse front tilting required for velocity matching in the present terahertz-generation setup according to the invention is a result of reflection on a periodic relief structure formed in the rear boundary surface of the nonlinear optical medium or on a relief structure which is arranged on a separate element and is in optical coupling with the rear boundary surface of said nonlinear optical medium, hereinafter the proposed inventive setup is referred to as "rear-side reflection" assembly, while a terahertz source incorporating such an assembly is referred to as "rear-side reflection" terahertz source.

If the value of γ is greater than 60° for a "rear-side reflection" terahertz source, i.e. in case of e.g. LN- and LT-based "rear-side reflection" terahertz sources, a part of the cross-section of a partial pump beam reflected from a certain first zone of width w collides into the adjacent first zone of width w. To avoid this, the pairs of first zones of width 2w are preferably separated by a second zone of width u (here, u is non-zero), which is preferably parallel to the front boundary surface of the nonlinear optical medium. The value of width u is at most several % of the value of width w, preferably at most 5% thereof.

Another preferred embodiment of the inventive solution is characterized, optionally for the choice of u=0, by a periodic relief structure that has a spatial period of width w which is in the order of magnitude of the wavelength of the pump beam. For terahertz generation, the pump beam emitted by the pump beam source enters the medium with nonlinear optical properties through the front boundary surface of the medium, travels through said medium, and then gets diffracted on either the structured rear boundary surface of the medium with the relief structure or on a surface relief which is formed in a separate element and is in optical coupling with said rear boundary surface. Said relief structure is formed in such a way that upon diffraction, the partial pump beams travels at the angle γ relative to the incoming pump beam (here, the angle relative to the incoming pump beam is acute angle). A yet further requisite is that the diffraction efficiency is large value in the applied diffraction order. Correspondingly, the relief structure is a "blazed" structure, wherein the spatial period of blazing ranges from 0.25 μm to 2.5 μm, more preferably from 0.5 μm to 1.5 μm. Accurate value of the width w of the relief structure is determined by the value of angle γ, the wavelength of the pump beam, and the optical refractive index of the medium together in harmony with the well-known grating equation, wherein d=2w or d=2w+u holds for the lattice spacing.

The intensity front of the diffracted beam is tilted relative to the phase front thereof with the angle γ. This tilted intensity front forms a plane which is parallel to both the front boundary surface and the rear average (or mid-) surface of the non-linear optical medium, and travels at a speed $v_{THz,f}$ corresponding to relation (1) in the direction of the front boundary surface of the medium. This intensity front moving at speed $v_{THz,f}$ generates terahertz radiation in the nonlinear optical medium in a manner consistent with velocity matching. The thus generated terahertz radiation travels towards and perpendicular to the front boundary surface of the nonlinear optical medium and then, upon reaching said front boundary surface, exits the nonlinear optical medium without changing its propagation direction—thus, after having been properly separated from the incoming pump beam, it can be used in further applications. Since the pulse front tilting required for velocity matching in the present terahertz-generation setup according to the invention is a result of diffraction on a periodic relief structure formed in the rear boundary surface of the nonlinear optical medium or on a relief structure which is arranged on a separate element and is in optical coupling with the rear boundary surface of said nonlinear optical medium, hereinafter the proposed inventive setup is referred to as "rear-side diffraction" assembly, while a terahertz source incorporating such an assembly is referred to as "rear-side diffraction" terahertz source.

In case of "rear-side reflection" and "rear-side diffraction" terahertz sources according to the invention, a possible way of forming the periodic relief structure is to mill the desired structure into the rear boundary surface of the nonlinear optical material used for the terahertz radiation generation in the pump beam propagation direction. Since micromachining of metals can be performed much more precisely than that of dielectrics, the desired relief structure can also be formed as a periodically machined separate metal element that is optically coupled to the perfectly flat rear boundary surface of the material with nonlinear optical properties used for the terahertz radiation generation. In such a case, said optical coupling can be realized by applying a refractive index matching medium. If the material with nonlinear optical properties used for the terahertz radiation generation is lithium niobate, preferably, a semiconductor nanocrystal emulsion with a layer thickness substantially equal to or slightly greater than the height of the steps formed in the metal element can be used as refractive index matching medium.

In order to prevent the generated terahertz radiation from entering the pump beam source and to ensure its easy use, two simple solutions can be used: (i) the front boundary surface of the medium with nonlinear optical properties is not arranged exactly perpendicular to the first propagation direction of the pump beam; (ii) a dichroic mirror is placed between the pump beam source and the medium with nonlinear optical properties at an angle to the first propagation direction of the pump beam, thereby modifying the propagation direction of the terahertz radiation generated. In case (i), a normal to the front boundary surface of the medium with nonlinear optical properties and the first propagation direction of the pump beam are preferably at an angle between 1° to 10° to each other.

The solution according to the present invention has a great advantage over the prior art terahertz radiation generation schemes discussed above, in which the LN (or LT) crystal used for terahertz-generation is designed as a large-angled prism. In the solution according to the invention, the (LN, LT or semiconductor) crystal with nonlinear optical properties can be used in the form of a plane-parallel optical element and thus highly efficient terahertz radiation generation of good beam quality can be achieved. The solution according to the invention is also advantageous over the prior art plane-parallel echelon contact grating, as it does not require pulse front pre-tilting, and thus there is no need to use an optical grating and imaging. As a result, a setup according to the invention contains fewer structural elements and thus takes up less space, i.e. is compact. A further highly significant advantage of the solution according to the invention compared to the former known working and conceptual solutions is that it is suitable for generating high-energy and high-quality terahertz beam/pulse(s) without optical imaging. This eliminates the loss of terahertz-generation efficiency caused by imaging errors. Furthermore, as there is no need for pre-tilting and the nonlinear optical medium is used with a plane-parallel geometry, the spot size of the terahertz beam obtainable by the terahertz-generation setup according to the invention and thus the energy of the terahertz pulses generated by the method according to the invention can be increased arbitrarily in practice.

BRIEF DESCRIPTION OF THE DRAWINGS

In what follows, the invention is described in detail with reference to the accompanying drawings, wherein.

DETAILED DESCRIPTION

Figure 1:
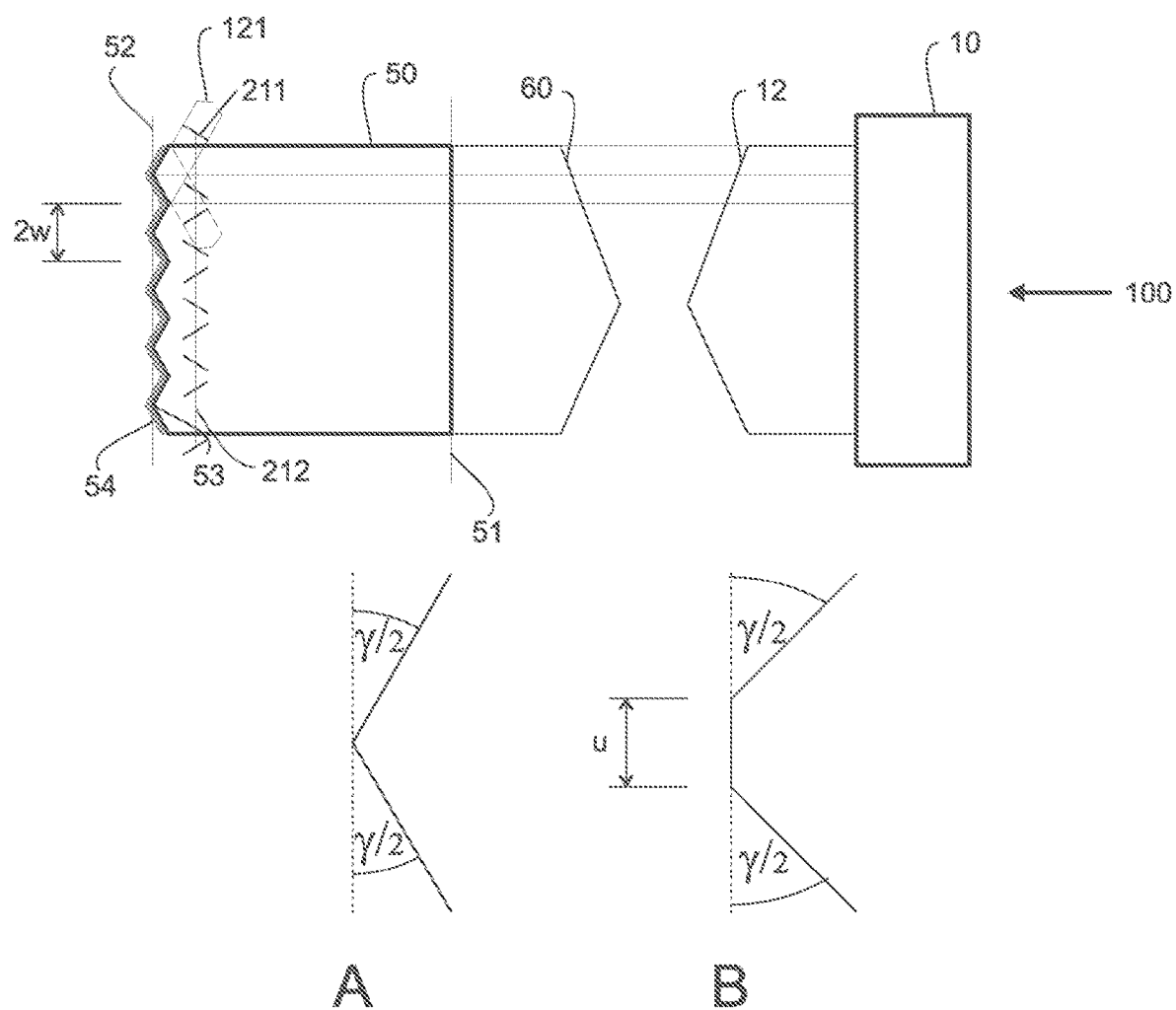
FIG. 1 is a longitudinal sectional view of an embodiment of a rear-side reflection/diffraction assembly to generate terahertz radiation according to the invention, implemented through a crystal with nonlinear optical properties, also showing the pump beam and the partial pump beams that form after at least one of reflection and diffraction on the periodic relief structure, as well as the pulse fronts of each partial pump beam at a given instant, the envelope of said pulse fronts, and the terahertz radiation generated.

FIG. 1 shows a preferred embodiment of a so-called rear-side reflection/diffraction type terahertz beam generating setup and a radiation source 100 for generating terahertz radiation in accordance with the invention. The beam source 100 comprises a pump source 10 providing a pump beam 12 and an optical element 50 made of a medium with non-linear optical properties in which the terahertz radiation is actually generated. The light-transmitting optical element 50 is bounded by a front boundary surface forming an entry plane 51 and a parallel reflection/diffraction rear boundary surface 52 having a periodic structure 53; consequently, the optical element 50 is preferably formed as a plane-parallel element. As the pump beam 12 passes through the optical element 50, as a result of the nonlinear optical interaction of the material of the pump beam 12 and the optical element 50, preferably by means of second harmonic generation or optical rectification, second harmonic radiation with a frequency higher than the frequency of the pump beam 12, and terahertz radiation with a frequency about two orders of magnitude lower than the frequency of the pump beam 12 arise. However, in the absence of phase matching (or, in terms of optical rectification, velocity matching according to relation (1)), the radiation generated by both the second harmonic generation and the optical rectification is of negligible intensity, and the pump beam 12 reaches the rear boundary surface 52 of the optical element 50 substantially unchanged. Here, said pump beam 12 suffers reflection and/or diffraction depending on the wavelength of the pump beam 12 and the size of the period of the periodic relief structure 53. In order to achieve a high degree of reflection, optionally, the rear boundary surface 52 is coated with a layer 54 (e.g., a metal or multilayer dielectric layer) that provides a high reflection in terms of the pump beam. As the rear boundary surface 52 comprises a periodic relief structure 53 with a spatial period of 2w, a plurality of pumping partial beams 121 of size w along a direction inclined in the plane of FIG. 1 is generated from the pump beam 12 via reflection and/or diffraction. In this case, the periodic relief structure 53 is formed in the rear boundary surface 52 in such a way that one period thereof consists of two flat parts. One of said flat parts is rotated clockwise, while the other is rotated counter-clockwise by an angle of γ/2 from the average plane of the rear boundary surface 52. Here, γ corresponds to the angle in the velocity matching condition of relation (1). The reflected and/or diffracted partial beams 121 are of width w, in which pulse fronts 211 (so-called pulse front segments) of width w and length Ti×$v_{p,cs}$, corresponding to the pulse length Ti of the pump beam, travel at a velocity $v_{p,cs}$ along a direction at angle γ relative to the propagation direction of the pump beam before its reflection and/or diffraction (i.e., the first propagation direction). Thus, the pulse fronts 211 individually do not satisfy the velocity matching condition of relation (1). At the same time, the planar envelope 212 of the segmented pulse front formed by the set of 211 pulse front segments travels towards the entry plane 51 (perpendicularly to the entry plane 51) at a velocity $v_{p,cs}$×cos γ, i.e., it satisfies the velocity matching condition of relation (1). Thus, through nonlinear optical interaction (preferably optical rectification or difference frequency generation), the segmented pulse front effectively generates such 60 terahertz radiation which travels in a direction identical to the propagation direction of the segmented pulse front (i.e., perpendicular to the input plane 51), and the wavelength of which is at least twice the size w×sin γ in the propagation direction of the individual pulse front 211 segments in the optical element 50.

The terahertz radiation 60 generated in the optical element 50 exits the optical element 50 through the inlet surface 51 and thus becomes usable for further applications.

The material of the optical element 50 has got a high nonlinear optical coefficient and is transparent at the wavelength of the pump beam. Examples of such materials are LN and LT, as well as several semiconductors, such as ZnTe, GaP, GaAs, GaSe.

The pump source 10 is preferably a laser source capable of emitting laser pulses, i.e., the pump beam 12, with a pulse length of at least 5 fs but at most a few hundred fs in the visible, near or medium infrared range, e.g. a diode-pumped Yb laser emitting at a central wavelength of 1030 nm, a titanium-sapphire laser emitting at a central wavelength of 800 nm, or a Ho laser emitting at a central wavelength of 2050 nm. Other lasers and optical parametric amplifiers can also be used as the pump source 10.

The periodic relief structure 53 is formed by a machining process (e.g., micromilling) known to a person skilled in the art in accordance with the enlarged part A or B of FIG. 1. If the optical element 50 has got such refractive index values at the wavelength of the pump beam 12 or the terahertz radiation 60 generated that the velocity matching condition of relation (1) is satisfied at angles less than 60° (such a material is most semiconductor), then, as is illustrated in the enlarged part A of FIG. 1, a single period consists of a first zone formed by two flat parts which, alternately clockwise or counterclockwise, form an angle γ/2 with the average (or center) plane of the rear boundary surface 52. If γ is greater than 60°, a portion of the cross section of the partial beams 121 would collide into the rear boundary surface 52 of the optical element 50 after reflection. To avoid this, width of the reflected partial beams 121 is limited in such a way that, as is shown in the enlarged part B of FIG. 1, a second zone of width u is formed in each case between the two oblique zones of width w, which is parallel to the entry plane 51. For LN, for example, when γ=62°, u/2w is only 6%.

The pump beam 12 arrives at the elements of width w of the relief structure 53 formed in the rear boundary surface 52 of the optical element 50 with an angle of incidence γ/2. This angle is greater than the limit of the total reflection for both LN and LT and most semiconductors (e.g., GaP, ZnTe). Thus, the reflection efficiency is high even without making use of reflection efficiency enhancing layers 54. Otherwise, it will be necessary to use a reflection efficiency enhancing layer 54.

The refractive indices of LN and LT for the pump beam 12 are, in general, greater than 2, and the refractive indices of most semiconductors approach or even exceed the value of 3. Therefore, in order to reduce reflection losses, it is preferable (but not necessary) to apply an antireflection coating well-known to a person skilled in the art on the entry plane 51 of the optical element 50.

The optical element 50 is made of a material which has an exceptionally high non-linear optical coefficient, i.e. the magnitude of which preferably is, in practice, at least 1 pm/V, typically higher than several tens pm/V. The optical element 50 is preferably made of LN or LT, as well as semiconductor materials, e.g. of GaP or ZnTe, preferably with a crystal axis orientation that is the most advantageous in terms of the generation efficiency of nonlinear optical processes, e.g. terahertz radiation generation through optical rectification.

Figure 2A:
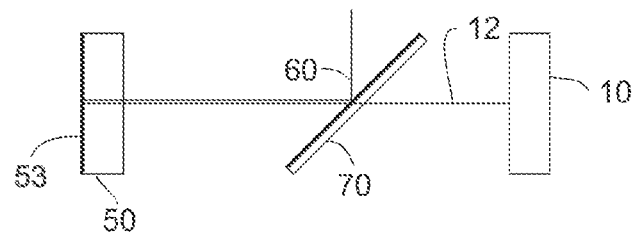
FIGS. 2A and 2B schematically illustrate a possible exemplary embodiment of an arrangement for separating the pump beam and the terahertz beam generated.
Figure 2B:
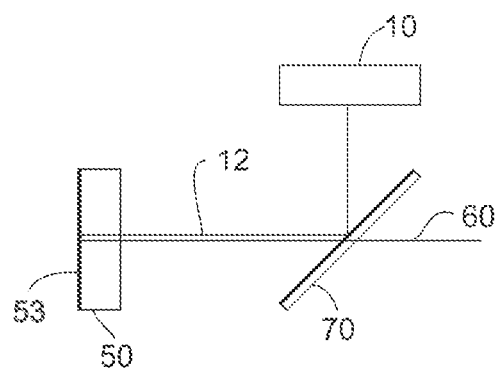

Since the optical element 50 used in the terahertz beam source 100 has plane-parallel front and rear boundary surfaces, and both the pump beam 12 and the terahertz radiation 60 generated propagate perpendicular to these surfaces (in opposite directions), there is a need to separate the pump beam 12 and the terahertz beam 60. This can be done by well-known techniques. FIGS. 2A and 2B, as well as FIG. 3 show, by way of example, some suitable techniques and separation mechanisms.

FIG. 2A shows a technical solution wherein the beams are separated by a dichroic mirror 70 inserted between the pump source 10 and the optical element 50. In the case illustrated in FIG. 2A, the dichroic mirror 70 exhibits high transmission at the wavelength of the pump beam 12 and high reflection at the wave-length of the terahertz radiation 60. For example, a sheet of quartz coated with an indium tin oxide (ITO) layer behaves in this way. FIG. 2B shows an arrangement wherein the dichroic mirror 70 exhibits high reflection at the wavelength of the pump beam 10 and high transmission at the wavelength of the terahertz radiation 60. For example, a sheet of quartz with a suitable dielectric layer structure applied thereon behaves in this way. The dichroic mirrors 70 used in these arrangements separate and transmit the terahertz radiation 60 generated and the pump beam 12 in different directions on the basis of a difference in their wavelengths, as is known to a skilled person in the art.

Figure 3:
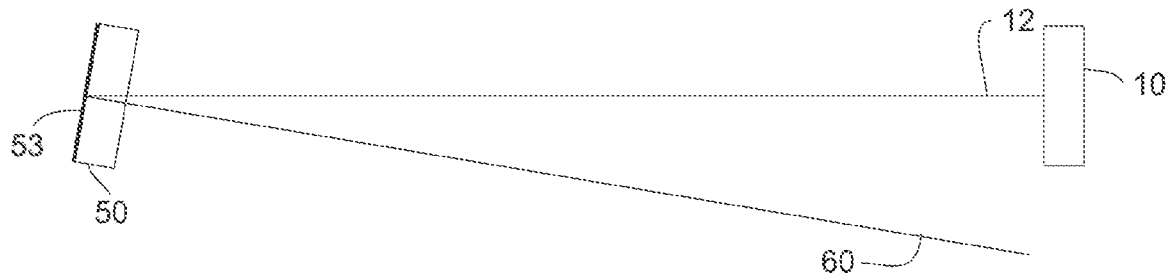
FIG. 3 schematically illustrates a possible alternative arrangement for separating the pump beam and the terahertz beam generated.

FIG. 3 shows a simple further technical solution to separate the pump beam 12 and the terahertz radiation 60 from one another. Here, the optical element 50 is slightly (typically in a few degrees, preferably in 1° to 10°, more preferably in 5° to 10°) tilted from its perpendicular position relative to the first propagation direction of the pump beam 12 in a plane perpendicular to the plane of FIG. 1 or FIG. 2, which is preferably effected by a suitable tilting device (e.g. a device rotating the optical element 50 at a small angle about an axis perpendicular to the first propagation direction of the pump beam 12). In this way, and by arranging the pump source 10 and the optical element 50 at a suitable distance from each other, spatial separation of the pump beam 12 and the terahertz radiation 60 is realized.

In order to operate the terahertz source 100 according to the present invention with high efficiency, the half-period w of the periodic structure 53 of the optical element 50 is chosen to be less than a half, preferably a third, more preferably a quarter of the wavelength of the terahertz radiation 60 within the optical element 50. This choice ensures that the phases of terahertz radiation generated at different parts of the pulse front 211 segments do not differ significantly from each other, and thus, constructive interference takes place amongst them. The length L of terahertz-generation is preferably in the order of cm, more preferably 5 to 15 mm, most preferably 5 to 10 mm, and depends on the material quality of the optical medium itself.

Figure 4:
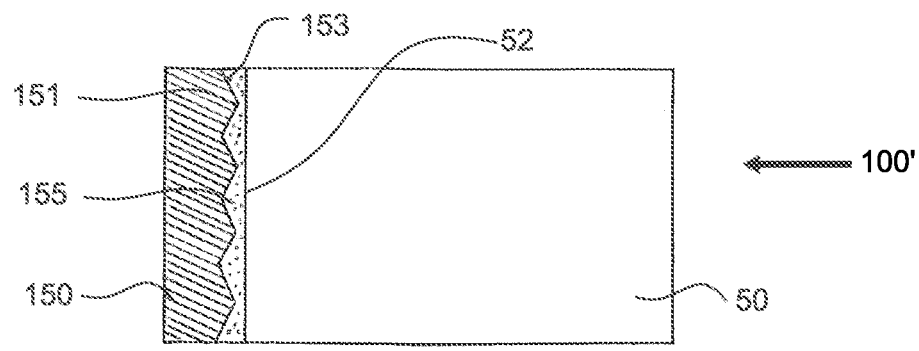
FIG. 4 schematically shows another possible embodiment of a nonlinear optical medium used in the embodiments of the rear-side reflection/diffraction assemblies shown in FIGS. 1 and 2, wherein the reflection/diffraction structure is formed in/on the surface of a separate element facing and being in optical coupling with the rear boundary surface of the nonlinear optical medium.

FIG. 4 illustrates a possible further embodiment of a rear-side reflection type optical element 50 with nonlinear optical properties used in the terahertz source according to the present invention. For the optical element 50 forming part of the terahertz source 100' shown in FIG. 4, the periodic relief structure is provided as a relief structure 153 formed in a surface 151 of a separate (additional) element 150, wherein said surface 151 faces to and extends in parallel to the rear boundary surface 52 of the optical element 50 and is in optical coupling with the rear boundary surface 52 of said optical element 50 with nonlinear optical properties. The design of the relief structure 153 formed in the element 150 (i.e., the parameters u, w) is identical to that of the relief structure 53 formed in the rear boundary surface 52 of the optical element 50 and described in detail above. The optical coupling between the rear boundary surface 52 of the optical element 50 and the element 150 or rather the relief structure 153 formed on/in said element 150, which serves to ensure smooth propagation of the pump beam and/or the partial pump beams, is provided by a refractive index matching medium 155 arranged between said elements. Said medium 155 is preferably a semiconductor nanocrystal emulsion, wherein the semiconductor nanocrystals are preferably e.g. GaN and/or ZnO nanocrystals, while the solvent is preferably e.g. butanol; semi-conductor nanocrystal emulsions useful for the present invention and their preparation are known to the skilled person in the art and will not be described in detail here. The element 150 is generally made of metal, preferably stainless steel or aluminum. The relief structure 153 is provided by e.g. a gold metal coating which is evaporated on a desired surface structure formed previously in the surface 151 of the element 150 by a suitable mechanical machining procedure (preferably micromilling). The layer thickness of the coating is preferably a few microns. To improve the quality of the optical coupling, protruding portions of the relief structure 153 of the optical element 150 are preferably in contact with the rear boundary surface 52 of the optical element 50 or located in a close vicinity thereof at a distance of up to a few microns.

Figure 5:
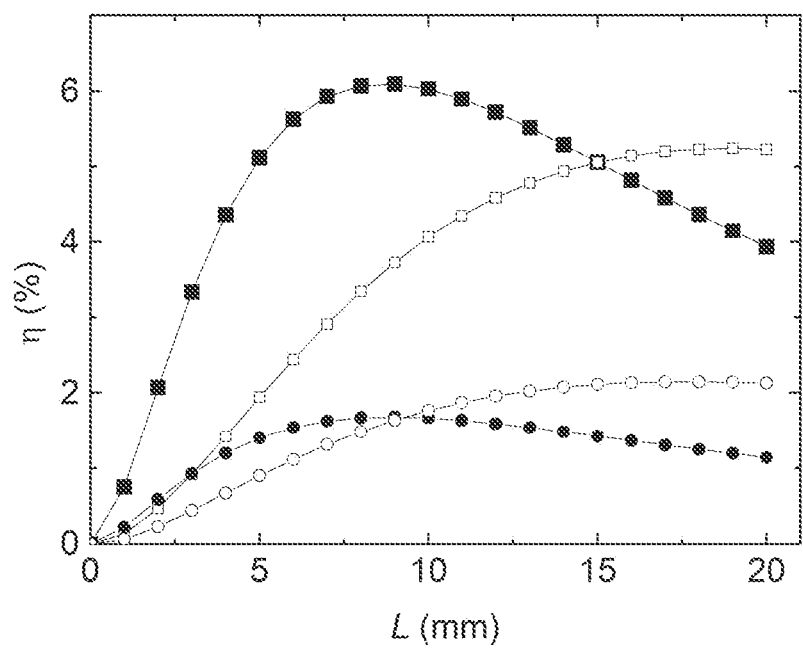
FIG. 5 shows, as comparison, the efficiency ($\eta$) of the terahertz radiation generation as a function of the thickness (L) of the nonlinear optical medium for pump pulses of 100 fs and 1 ps and with a wavelength of 800 nm for a rear-side reflection assembly according to the invention and a hybrid echelon arrangement; here the pump beam intensities for the two pump pulses is 200 GW/cm$^2$ and 40 GW/cm$^2$, respectively, while the temperature, the step width and the half-period are T=100 K and w=100 µm in both cases.

FIG. 5 shows how the efficiency of terahertz radiation generation, according to theoretical calculations, depends on the crystal length at pumping pulse lengths of 100 fs and 1.0 ps for terahertz sources constructed in accordance with the present invention and with the previously proposed plane-parallel hybrid echelon assembly (see L. Pálfalvi et al., Optics Express, vol. 25, issue 24, pp. 29560-29573 (2017)). In the case of pumping at 100 fs (see solid squares, circles) w=80 μm, which is justified by the fact that for the previously proposed plane-parallel terahertz radiation source, the maximum terahertz-generation efficiency is associated with this value of w. In the case of pumping at 1.0 ps (see empty squares, circles) w=100 μm. As can be seen, in terms of the efficiency at 100 fs and at 1.0 ps, the previous arrangement (see squares) is approx 3.6 times and approx. 2.5 times, respectively, more favorable than the setup according to the present invention (see circles). It should be noted, however, that when using wide beams, the ratio of generating efficiencies for the two constructions decreases to less than two for shorter pumping lengths, since in the previous arrangement, the theoretically obtained efficiency is only achievable in the middle of the beam and significantly decreases at the beam edges, as is obvious in light of FIG. 6A.

The lower generation efficiency belonging to the setup according to the present invention is fully compensated by the fact that its design/construction is significantly simpler than that of the previous terahertz-generation schemes, and the setup itself contains significantly fewer elements, so that a more compact design is possible. Furthermore, the setup according to the invention does contain no imaging element, thus when used, there are, of course, no imaging errors and, hence, no associated pump pulse elongation appears.

Figure 6A:
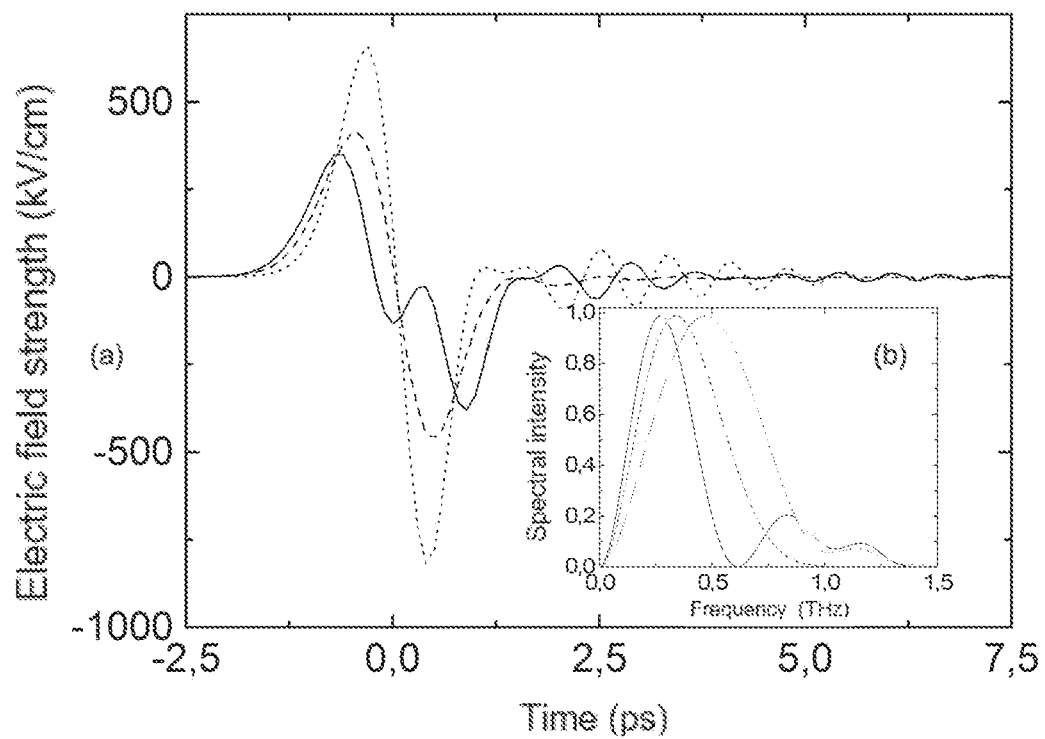
FIG. 6 shows the time course of the electric field strength of the terahertz pulses produced by a rear-side reflective terahertz beam source according to the invention for pumping laser pulses of 100 fs (FIG. 6A) and 1.0 ps (FIG. 6B).
Figure 6B:
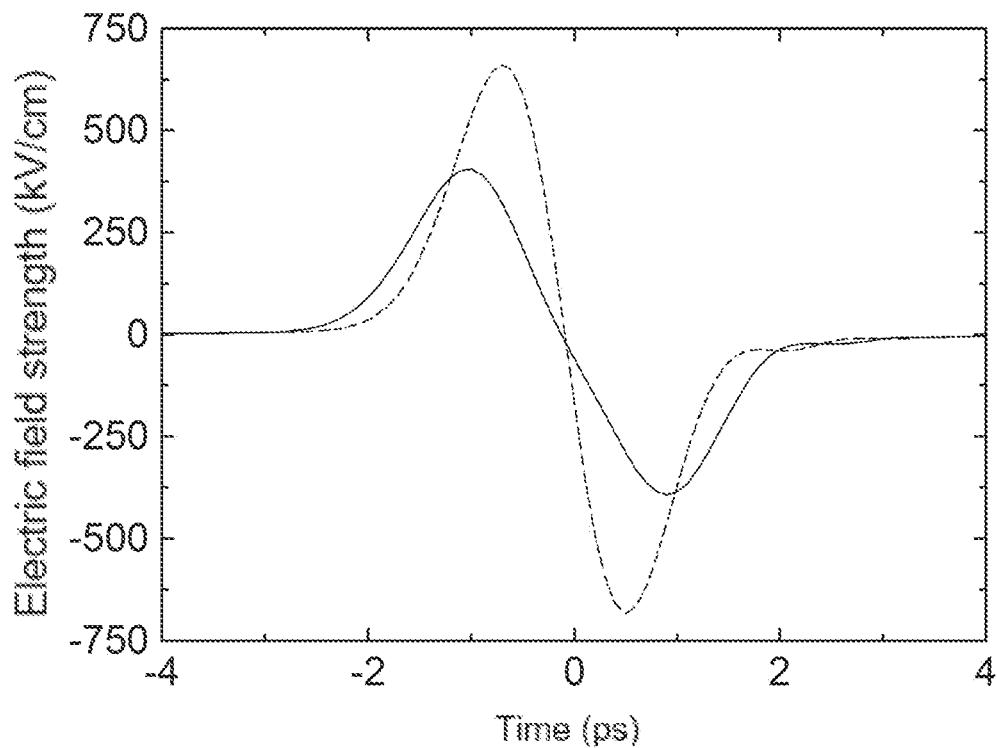

FIGS. 6A and 6B show the time course of the electric field strength in the terahertz radiation generated by a beam source 100 implemented with a rear-side reflection assembly of the present invention and in the terahertz radiation generated by the formerly proposed plane-parallel structure (for further details, see L. Pálfalvi et al., Optics Express, vol. 25, issue 24, pp. 29560-29573 (2017)) for pump beams 12 comprised of 100 fs and 1.0 ps pulses, respectively, at the intensities of 200 $GW/cm^2$ and 40 $GW/cm^2$ and with a central wavelength of 800 nm, obtained through model calculations. According to the example, the values of w are 80 μm and 100 μm, respectively, the optical element 50 is made of LN and is cooled to a temperature of T=100 K during terahertz generation. For pump pulses of 100 fs, the former arrangement generates terahertz pulses of smaller amplitude and lower frequency at the edges of the beam (see FIG. 6A and its insert (b), dashed line) than in the center of the beam (see FIG. 6A and its insert (b), dotted line). In contrast, in a radiation source 100 according to the present invention, an electric field with the same time course is generated everywhere in the cross section of the pump beam 12 (see FIG. 6A, solid line). This is highly advantageous for many applications of terahertz pulses, especially when strong focusing of the terahertz beam is required. Here, the term "strong focusing" refers to a focusing with a numerical aperture in value close to 1, in harmony with literature.

A detailed description of the model underlying the derivation of each of the curves shown in FIGS. 5 and 6 goes beyond the scope of the present application; it is part of a scientific publication by the inventors to be published in the near future. However, it is apparent from FIG. 6B that a radiation source 100 comprising the setup according to the invention is suitable for generating single-cycle terahertz pulses which are free of post-oscillation. Such pulses can be advantageously used, for example, to accelerate electrically charged particles.

It is also important to note that the radiation source 100 comprising the setup according to the present invention—when using with a suitable pump laser—is also capable of producing any number of multi-cycle terahertz pulses at high efficiency.

Summary: A novel terahertz generation setup suitable for generating high-energy terahertz radiation with a periodic structure formed in the rear-side surface of a nonlinear optical medium bounded by planar front-side (entry) and rear-side surfaces has been elaborated. The greatest advantage of the obtained setup is that the nonlinear optical crystal can be used in the setup as a unit with parallel surfaces. As a result, terahertz beams with excellent beam quality and physical properties can be generated at high generation efficiency. Since the setup does not include imaging optics or a separately adjustable optical grating, the size of the pump beam and thus the energy of the terahertz pulses generated in the setup can be arbitrary in practice. The terahertz radiation source and method according to the invention based on the inventive setup is particularly advantageous in the production of high-energy terahertz radiation which requires the usage of wide pump beams.

The invention claimed is:

1. A method to generate terahertz radiation comprising:
providing a plane-parallel optical element formed of a medium with nonlinear optical properties having a plane entry surface and a rear boundary surface parallel to the entry surface,
coupling a pump beam into the optical element through the entry surface, perpendicularly to the entry surface,
directing said pump beam along a first propagation direction to one of:
a periodic relief structure formed in the rear boundary surface of the optical element; or
a periodic relief structure formed in a surface of an additional element, said surface facing the rear boundary surface, extending parallel to the rear boundary surface and being optically coupled to the rear boundary surface of the optical element,
subjecting the pump beam to at least one of reflection or diffraction, splitting thereby the pump beam into partial beams, said partial beams having a common planar envelope, and
generating terahertz radiation by the partial beams, as pump beams, in the nonlinear optical medium through nonlinear optical interaction, and
decoupling the terahertz radiation from the optical element through the entry surface, wherein said one of the periodic relief structures comprises:
at least first zones perpendicular to the first propagation direction and parallel to each other,
individual ones of said first zones having a symmetrical V-shape in a plane section along
the first propagation direction, a magnitude of angles formed by legs of said V-shape and
the rear boundary surface being half an angle (γ) of pulse-front-tilting required to satisfy
the velocity matching condition of $$v_{p,cs} \cos(\gamma) = v_{THz,f} \tag{1}$$

within the optical medium, wherein $v_{p,cs}$ is a group velocity of the pump beam, $v_{THz,f}$ is a phase velocity of the terahertz radiation and (γ) is the angle of pulse-front-tilting, and wherein, after said reflection and/or diffraction, the partial beams propagate at an angle g to the first propagation direction, and the planar envelope travels at a speed $v_{THz,f}$ towards the entry surface of the optical element.

2. The method according to claim 1, further comprising directing the pump beam along the first propagation direction to the periodic relief structure and subjecting the pump beam to reflection, wherein said periodic relief structure further comprises second zones perpendicular to the first propagation direction, parallel to each other, and arranged alternately with said first zones, wherein each of said second zones form an angle with the rear boundary surface which results in pulse-front-tilting the pump beam to an angle which is insufficient to satisfy the velocity matching condition of relation (1).

3. The method according claim 2, wherein the second zones are substantially parallel to the rear boundary surface.

4. The method according to claim 2, wherein a width (u) of said second zones is at most 5% of a width (2w) of said first zones.

5. The method according to claim 1, further comprising separating the terahertz radiation from the pump beam for further use after being decoupled from the optical medium.

6. The method according to claim 1, further comprising separating the terahertz radiation from the pump beam by arranging a dichroic mirror in the path of the terahertz radiation.

7. The method according to claim 1, further comprising separating the terahertz radiation from the pump beam by rotating the optical element by ten degrees or less about an axis perpendicular to the first propagation direction.

8. The method according to claim 1, wherein the non-linear optical medium is lithium niobate (LN), lithium tantalate (LT), or a semiconductor selected from the group consisting of GaP, ZnTe, and GaAs.

9. The method according to claim 1, wherein the pump beam is a laser pulse in the visible, near-infrared or medium-infrared range, with a pulse length ranging from at least 5 femtoseconds to at most a few picoseconds.

10. The method according to claim 1 further comprising using the generated terahertz radiation to monochromatize and synchronously accelerate electrically charged particles.

11. An optical element to generate terahertz radiation with a pump beam, the optical element comprising: a medium with non-linear optical properties bounded in longitudinal direction by front and rear boundary surfaces parallel to each other, and including a periodic relief structure formed in the rear boundary surface,
said periodic relief structure comprising at least first zones perpendicular to the longitudinal direction and parallel to each other, each of said first zones having a symmetrical V-shape in a plane section along the longitudinal direction, a magnitude of angles formed by legs of said V-shape and the rear boundary surface being half an angle (γ) of pulse-front-tilting required to satisfy the velocity matching condition of $$v_{p,cs} \cos(\gamma) = v_{THz,f} \tag{1}$$

within the optical medium, wherein $v_{p,cs}$ is a group velocity of the pump beam, $v_{THz,f}$ is a phase velocity of the terahertz radiation and (γ) is the angle of pulse-front-tilting.

12. The optical element according to claim 11, wherein the periodic relief structure is a blazed relief structure.

13. The optical element according to claim 11, wherein the periodic relief structure further comprises second zones perpendicular to the longitudinal direction, parallel to each other, and arranged alternately with said first zones, individual ones of said second zones forming an angle with the rear boundary surface which results in pulse-front-tilting the pump beam to an angle which is insufficient to satisfy the velocity matching condition of relation (1).

14. The optical element of claim 13, wherein the second zones are substantially parallel to the rear boundary surface.

15. The optical element according to claim 13, wherein a width (u) of the second zones is at most 5% of a width (2w) of the first zones.

16. The optical element according to claim 11, wherein the medium with nonlinear optical properties is made of a substance having a nonlinear optical coefficient of at least 160 pm/V, whose refraction indices in the terahertz and the visible domains differ from each other by a factor of at least two.

17. The optical element according to claim 11, wherein the medium with nonlinear optical properties is lithium niobate (LiNbO3), lithium tantalate (LiTaO3), or a semiconductor selected from the group consisting of GaP, ZnTe, and GaAs.

18. A terahertz radiation source, comprising:
a pump source to emit and couple a pump beam into a light path;
an optical element according to claim 11 arranged in the light path in such a way that the front and rear boundary surfaces are substantially perpendicular to said light path to generate the terahertz radiation;
a mechanism to separate the terahertz radiation exiting the optical element and the pump beam coupled into the light path.

19. The radiation source according to claim 18, wherein the mechanism comprises a dichroic mirror arranged in the path of the generated terahertz radiation.

20. The radiation source according to claim 18, wherein the mechanism comprises a tilting mechanism which tilts the front boundary surface of the optical element in the light path by ten degrees or less relative to the pump beam striking substantially perpendicular onto said front boundary surface.

21. The radiation source according to claim 18, wherein the pump source is a pump source configured to emit laser pulses in the visible, near-infrared or medium-infrared range, with a pulse length ranging from at least 5 femtoseconds to at most a few picoseconds.

22. An optical element to generate terahertz radiation with a pump beam comprising:
a medium with non-linear optical properties bounded in longitudinal direction by front and rear boundary surfaces parallel to each other, wherein the rear boundary surface of the optical element is optically coupled to a surface of an additional element, said surface facing the rear boundary surface and extending parallel to the rear boundary surface, wherein a periodic relief structure is formed in said surface, said periodic relief structure comprising at least first zones perpendicular to the longitudinal direction and parallel to each other, individual ones of said first zones having a symmetrical V-shape in a plane section along the longitudinal direction, a magnitude of angles formed by legs of said V-shape and the rear boundary surface being half an angle ($\gamma$) of pulse-front-tilting required to satisfy the velocity matching condition of $$v_{p,cs} \cos(\gamma) = v_{THz,f} \quad (1)$$

within the optical medium, wherein $v_{p,cs}$ is a group velocity of the pump beam, $v_{THz,f}$ is a phase velocity of the terahertz radiation and ($\gamma$) is the angle of pulse-front-tilting.

23. The optical element according to claim 22, wherein the additional element is made of a metal.

24. The optical element according to claim 22, wherein a metal coating is applied to the periodic relief structure formed in the surface of the additional element facing the rear boundary surface.

25. The optical element according to claim 22, wherein a refractive index matching medium is arranged between the rear boundary surface and the surface of the additional element facing the rear boundary surface to provide the optical coupling.

26. The optical element of claim 25, wherein the refractive index matching medium is a semiconductor nanocrystal emulsion.

27. The optical element according to claim 22, wherein the additional element is made of at least one of stainless steel and aluminum.

28. The optical element according to claim 22, wherein a gold layer is applied to the periodic relief structure formed in the surface of the additional element facing the rear boundary surface, said gold layer having a layer thickness up to a few microns.

29. The optical element according to claim 22, wherein the periodic relief structure is a blazed relief structure.

30. The optical element according to claim 22, wherein the periodic relief structure further comprises second zones perpendicular to the longitudinal direction, parallel to each other, and arranged alternately with said first zones, individual ones of said second zones forming an angle with the rear boundary surface which results in pulse-front-tilting the pump beam to an angle which is insufficient to satisfy the velocity matching condition of relation (1).

31. The optical element of claim 30, wherein the second zones are substantially parallel to the rear boundary surface.

32. The optical element according to claim 30, wherein a width (u) of the second zones is at most 5% of a width (2w) of the first zones.

33. The optical element according to claim 22, wherein the medium with nonlinear optical properties is made of a substance having a nonlinear optical coefficient of at least 160 pm/V, whose refraction indices in the terahertz and the visible domains differ from each other by a factor of at least two.

34. The optical element according to claim 22, wherein the medium with nonlinear optical properties is lithium niobate (LiNbO3), lithium tantalate (LiTaO3), or a semiconductor selected from the group consisting of GaP, ZnTe, and GaAs.

35. A terahertz radiation source, comprising:
a pump source to emit and couple a pump beam into a light path;
an optical element according to claim 22 arranged in the light path in such a way that the front and rear boundary surfaces are substantially perpendicular to said light path to generate the terahertz radiation;
a mechanism to separate the terahertz radiation exiting the optical element and the pump beam coupled into the light path.

36. The radiation source according to claim 35, wherein the mechanism comprises a dichroic mirror arranged in the path of the generated terahertz radiation.

37. The radiation source according to claim 35, wherein the mechanism comprises a tilting mechanism which tilts the front boundary surface of the optical element in the light path by ten degrees or less relative to the pump beam striking substantially perpendicular onto said front boundary surface.

38. The radiation source according to claim 35, wherein the pump source is a pump source configured to emit laser pulses in the visible, near-infrared or medium-infrared range, with a pulse length ranging from at least 5 femtoseconds to at most a few picoseconds.

* * * * *